United States Patent Office 3,303,202
Patented Feb. 7, 1967

3,303,202
ANTIFUNGAL COMPOUNDS
Gian Gualberto Gallo, Piero Sensi, and Carmine Renato, Pasqualucci, Milan, Italy, assignors to Lepetit S.p.A., Milan, Italy
No Drawing. Filed July 2, 1963, Ser. No. 292,475
Claims priority, application Great Britain, July 17, 1962, 27,441/62
6 Claims. (Cl. 260—340.2)

This invention is concerned with new antifungal compounds and a process for preparing the same. More particularly, the compounds of this invention are polyhalogenated 1,4-dioxaspiro-[4,5]-deca-6,9-diene-2,8-diones of the formula

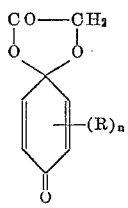

wherein R is a halogen atom and $n$ is an integer from 2 to 4 inclusive.

The new compounds of the invention show a high degree of antibacterial activity, particularly against some pathogenic microorganism. Among these, Staphylococcus aureus, Proteus vulgaris and Trichophyton mentagrophytes are particularly sensitive. Another class of microorganisms against which the compounds of the invention are highly effective are those which are pathogenic for plants. For instance, 6,7,9,10 - tetrachloro - 1,4-dioxaspiro-[4,5]-deca-6,9-diene-2,8-dione, at a dilution of 4.8 p.p.m., kills 50% of a culture of Stemphylium sarcinaeforme, and 95% at a dilution of 20 p.p.m. About the same results were obtained with the 7.9-dibromo derivative.

The process for preparing the new compounds consists in subjecting a 4-hydroxyphenoxyacetic acid of the formula

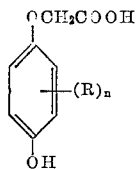

wherein R is a halogen atom and $n$ is a whole number from 0 to 4 inclusive, to the action of a halogen in the presence of a proton acceptor in an inert organic solvent at room temperature. While causing formation of the spiro ring, the halogen, when not readily present in the benzene ring, is simultaneously introduced under the reaction conditions forming the poly-halogenated derivatives. The reaction runs in practically quantitative yields, and is to our knowledge the best way to prepare the new compounds. However, other processes of preparation are still useful, though they are not claimed here as they give lower yield. For instance, oxidation may be carried out with ceric sulfate in sulfuric acid, potassium bichromate in acidic medium, lead dioxide in acidic medium, hydrogen peroxide in slightly acidic medium and so on.

The following are examples of prepartaion of the new antifungal compounds, together with indications useful for the preparation of some starting compounds when they are new and described for the first time in this application.

EXAMPLE 1

7,9-dibromo-1,4-dioxaspiro-[4,5]-deca-6,9-diene-2,8-dione

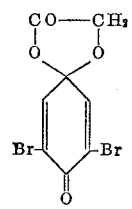

A solution of 15 g. of bromine in 150 ml. of dioxane is slowly added to a solution of 5 g. of 4-hydroxyphenoxyacetic acid and 10 g. of pyridine in 100 ml. of dioxane. The precipitated pyridine hydrobromide is filtered off and the solution is concentrated in vacuo to a volume of about 25 ml. By addition of water a white product precipitates and is collected and dried. M.P. 161–162° C.
Analysis for $C_8H_4Br_2O_4$ calcd.: C 29.65, H 1.24, Br 49.34. Found: C 29.75, H 1.55, Br 49.10.

EXAMPLE 2

7,9-dichloro-1,4-dioxaspiro-[4,5]-deca-6,9-diene-2,8-dione and 6,7,9 - trichloro - 1,4 - dioxaspiro-[4,5]-deca-6,9-diene-2,8-dione Into a mixture of 5 g. of 4-hydroxyphenoxyacetic acid, 20 g. of calcium oxide and 250 ml. of ethyl ether, gaseous chlorine is bubbled for about 2 hours. The mixture is filtered, the filtrate is washed with phosphate buffer pH 7 and evaporated to dryness. By fractional crystallization from benzene two products are obtained, of which the less soluble has M.P. 166–168° C. and is 7,9-dichloro-1,4-dioxaspiro-[4,5]-deca-6,9-diene-2,8-dione.
Analysis for $C_8H_4Cl_2O_4$ calcd.: C 40.88, H 1.72, Cl 30.17. Found: C 40.53, H 1.87, Cl 30.57.
The product more soluble in benzene has M.P. 175–176° C. and is 6,7,9-trichloro-1,4-dioxaspiro-[4,5]-deca-6,9-diene-2,8-dione.
Analysis for $C_8H_3Cl_3O_4$ calcd.: C 35.66, H 1.12, Cl 39.47. Found: C 35.46, H 1.32, Cl 39.68.

EXAMPLE 3

6,7,9,1-tetrachloro-1,4-dioxaspiro-[4,5]-deca-7,9-diene-2,8-dione

To a solution of 3.8 g. of chloroacetic acid in 100 ml. of water, 10 g. of 2,3,5,6-tetrachloro-hydroquinone are added followed by 4 ml. of 40% of sodium hydroxide, added cautiously in a nitrogen stream. The mixture is then heated 4 hours at 100° C., cooled and made acidic by the addition of hydrochloric acid. The precipitate is collected, dissolved in ethyl ether and extracted with acetate buffer pH 4.5. The buffer solution is made more strongly acidic with HCl and extracted with ethyl ether. After evaporation of the solvent the residue is recrystallized from benzene-ethanol mixture. The product 2,3,5,6-tetrachloro-4-hydroxyphenoxyacetic acid has M.P. 219–220° C.
Analysis for $C_8H_4Cl_4O_4$ calcd.: C 31.40, H 1.32, Cl 46.32. Found: C 31.68, H 1.42, Cl 46.74.
To a solution of 5 g. of 2,3,5,6-tetrachloro-4-hydroxyphenoxyacetic acid and 2.7 g. of pyridine dissolved in 200 ml. of dioxane a solution of 2.7 g. of bromine in 30 ml. of dioxane is gradually added, then the precipitated pyridine hydrobromide is filtered off and the filtrate is concentrated in vacuo to a volume of about 50 ml. By the addition of water a white product precipitates and is collected and dried. The product is 6,7,9,10-tetrachloro-1,4-dioxaspiro - [4,5] - deca - 6,9-diene-2,8-dione, M.P. 160–162° C.
Analysis for $C_8H_2Cl_4O_4$ calcd.: C 31.61, H 0.66, Cl 46.67. Found: C 31.55, H 0.88, Cl 46.88.

The same compound is obtained from the same starting material through the following reactions:
(a) Chlorine bubbling into a dioxane solution;
(b) by oxidation with ceric sulfate in sulfuric acid;
(c) With potassium bichromate in acidic medium;
(d) With lead dioxide in acidic medium;
(e) With hydrogen peroxide in slightly acidic medium.

We claim:
1. A process for preparing 1,4-dioxaspiro-[4,5]-deca-6,9-diene-2,8-diones of the formula

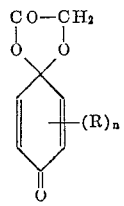

wherein R is chlorine or bromine, $n$ is an integer from 2 to 4 inclusive, which comprises subjecting a 4-hydroxyphenoxyacetic acid of the formula

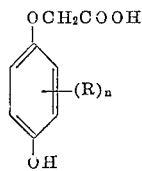

wherein R has the above significance, $n$ is a whole number from 0 to 4, to the action of chlorine or bromine in the presence of a pyridine proton acceptor in dioxane or diethyl ether as inert organic solvent.

2. A compound of the formula

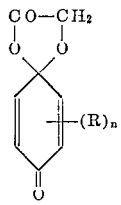

wherein R is a chlorine or bromine atom, $n$ is an integer from 2 to 4 inclusive.

3. 7,9 - dibromo - 1,4-dioxaspiro-[4,5]-deca-6,9-diene-2,8-dione.

4. 7,9 - dichloro - 1,4-dioxaspiro-[4,5]-deca-6,9-diene-2,8-dione.

5. 6,7,9 - trichloro - 1,4 - dioxaspiro - [4,5] - deca - 6,9-diene-2,8-dione.

6. 6,7,9,10 - tetrachloro - 1,4-dioxaspiro-[4,5]-deca-6,9-diene-2,8-dione.

No references cited.

WALTER A. MODANCE, *Primary Examiner.*

N. S. MILESTONE, *Assistant Examiner.*